(12) United States Patent
Hwang

(10) Patent No.: US 7,743,193 B2
(45) Date of Patent: Jun. 22, 2010

(54) LOGIC GATEWAY CIRCUIT FOR BUS THAT SUPPORTS MULTIPLE INTERRUPT REQUEST SIGNALS

(75) Inventor: Yau-Shi Hwang, Sinjhuang (TW)

(73) Assignee: TPK Touch Solutions Inc., Taipei (TW)

( * ) Notice: Subject to any disclaimer, the term of this patent is extended or adjusted under 35 U.S.C. 154(b) by 154 days.

(21) Appl. No.: 11/979,078

(22) Filed: Oct. 31, 2007

(65) Prior Publication Data
US 2009/0113100 A1   Apr. 30, 2009

(51) Int. Cl.
G06F 13/24 (2006.01)
G06F 13/36 (2006.01)
G06F 13/20 (2006.01)

(52) U.S. Cl. .......................... 710/260; 710/306; 710/313

(58) Field of Classification Search .................. 710/260, 710/306, 313
See application file for complete search history.

(56) References Cited

U.S. PATENT DOCUMENTS

| | | | |
|---|---|---|---|
| 5,951,669 A * | 9/1999 | Bailey et al. ................. | 710/260 |
| 6,085,279 A | 7/2000 | Suzuki | |
| 6,192,442 B1 * | 2/2001 | Haren et al. ................. | 710/269 |
| 6,263,395 B1 | 7/2001 | Ferguson et al. | |
| 6,401,154 B1 * | 6/2002 | Chiu et al. ................... | 710/260 |
| 6,772,257 B1 * | 8/2004 | Futral .......................... | 710/260 |
| 7,054,974 B2 | 5/2006 | Quach et al. | |
| 7,181,559 B2 * | 2/2007 | Barth et al. .................. | 710/263 |
| 2005/0071531 A1 | 3/2005 | Oshins | |
| 2006/0265536 A1 | 11/2006 | Chen | |

FOREIGN PATENT DOCUMENTS

| | | |
|---|---|---|
| CN | 1938686 | 3/2007 |
| EP | 0786726 | 12/1996 |
| EP | 0840226 | 5/1998 |

OTHER PUBLICATIONS

Shanley, T., et al.; "ISA System Architecture"; Mindshare, Inc.; Feb. 2000; pp. 365-367, 391-395; XP002501309.
Communication from the European Patent Office dated Nov. 12, 2008 with regard to the corresponding foreign application EP08000838.

* cited by examiner

Primary Examiner—Mark Rinehart
Assistant Examiner—Christopher A Daley
(74) Attorney, Agent, or Firm—Rosenberg, Klein & Lee

(57) ABSTRACT

A logic gateway circuit is provided for a bus to support multiple interrupt request signals, including an output OR gate having a plurality of input terminals and an interrupt request signal output signal, an inverter having an input terminal connected to the interrupt request signal output terminal of the output OR gate and an output terminal, and a plurality of gateway circuits to respectively and selectively device-end interrupt request signals generated by a plurality of target devices to transmit through the gateway circuit to the output OR gate or to queue the device-end interrupt request signals in the gateway circuit. Each gateway circuit includes an AND gate and an OR gate, wherein the OR gate bases on the states of an output terminal of the AND gate and the interrupt request signal output terminal of the output OR gate to generate a gateway signal to a gateway signal input terminal of the AND gate.

5 Claims, 4 Drawing Sheets

LOGIC GATEWAY CIRCUIT FOR BUS THAT SUPPORTS MULTIPLE INTERRUPT REQUEST SIGNALS

FIELD OF THE INVENTION

The present invention relates to a processing circuit for interrupt request signal, and in particular to a bus interface processing circuit that supports multiple interrupt request signals in a computer system.

BACKGROUND OF THE INVENTION

The architecture of standard computer systems or digital systems often include hardware components including central processing units, disk drives, input means, output means, and memories. All the hardware components are linked together by buses for data transfer and control purposes. Currently, a number of different specifications for bus are available for different system requirements and features.

Referring to FIG. 1 of the attached drawings, a computer system or a digital system that includes an ISA (Industry Standard Architecture) bus is shown. The computer system comprises a central processing unit 11, a memory 12, a PCI (Peripheral Component Interconnect) bridge 13, at least one PCI device 14, a PCI/ISA bridge 15, and a plurality of ISA devices D1 to Dn. The central processing unit 11 and the memory 12 are connected to a system bus 21 that is connected via the PCI bridge 13 to a PCI bus 22. The PCI bus 22 is a bus having specification formulated by PCISIG and serves to provide high speed data transfer in a microprocessor system. The PCI bus 22 is provided for connection with various PCI devices 14, such as interface devices including local area network interface card, video card, and input/output interface card. The PCI bus 22 is connected to an ISA bus 23 via the PCI/ISA bridge 15. The ISA bus 23 provides a connection with various ISA devices D1 to Dn. Each ISA device D1, D2, ..., Dn, which is also referred to as a target device, operates to generate a device-end interrupt request signal D1_INT, D2_INT, ..., Dn_INT, which is forwarded by the ISA bus 23 to an interrupt request signal controller 16 to carry out an interrupt service routine associated with the specific interrupt request signal.

SUMMARY OF THE INVENTION

In the currently available specification of ISA bus, an ISA bus can only support at most eleven ISA devices that generate interrupt request signals. For more than eleven ISA devices that send out interrupt requests, the current solution is to arrange specific software or drive programs in the system in order to handle those interrupt request signals.

For example, in the known technology, in order to support more than the standard number of interrupt request signals, some of the devices that send out interrupt request must be for example connected to an interrupt request signal end of the system by sharing logic circuit. And, the system must be loaded with specific or customized software or drive program to handle the interrupt service routines.

In the prior art, when an ISA bus detects a rising edge of an interrupt request signal generated from a device end, if a conventional logic circuit is used without employing specific/customized software or drive program, almost all the interrupt request signals are subjected to missing and failing to handle and the interrupt request input terminal of the ISA bus will be locked so that the status of the logic circuit is always presented in a high state.

Such a conventional technique does not only suffer signal missing in handling interrupt request signals, but is also slow in normally processing the interrupt request signal. Further, it increases the load of a computer system in handling interrupt request signal in practical applications. This causes adverse influence on system development for the industry.

Thus, the primary objective of the present invention is to provide a processing circuit for processing multiple interrupt request signals. The present invention provides a design that employs a logic gateway circuit to support a plurality of interrupt request signals generated from a plurality of target devices in order to ensure the target devices that generate the interrupt request signals in smooth operation.

Another objective of the present invention is to provide a processing circuit that processes multiple interrupt request signals for an ISA bus of a computer system or a digital system so that the interrupt service routines associated with the interrupt request signals can be smoothly operated without installing or loading specific or customized software or drive programs.

To solve the problems, the solution of the present invention resides in that an interrupt request signal generated by each target device is subjected to processing by a logic gateway circuit of the present invention and the logic gateway circuit then generates an interrupt request signal to the bus. The logic gateway circuit comprises an output OR gate having a plurality of input terminals and an interrupt request signal output terminal, an inverter having an input terminal and an output terminal of which the input terminal is connected to the interrupt request signal output terminal of the output OR gate, a plurality of gateway circuits, which respectively receive interrupt request signals from a plurality of target devices to transmit through the gateway circuit to the output OR gate or to queue the interrupt request signals in the gateway circuit.

In a preferred embodiment of the present invention, each of the gateway circuits comprises an AND gate and an OR gate, wherein the OR gate bases on the statuses of an output terminal of the AND gate and the interrupt request signal output terminal of the output OR gate to generate a gateway signal to a gateway signal input terminal of the AND gate.

As compared to the prior art technology, the solution of the present invention breaks the limitation on the number of interrupt request signals to which a conventional computer bus is subjected without using any specific or customized software or drive program.

The present invention employs a simply-structured logic gateway circuit to process interrupt request signals generated from device ends. When the processing circuit of the present invention receives more than one interrupt request signals, the interrupt request signals that are behind the second one queue until the system resumes available for response. The present invention provides a novel interrupt sharing processing circuit that requires no specific software or drive programs.

The present invention is applicable to an ISA bus of an existing computer system, wherein when one or some interrupt requests occurs, the logic gateway circuit of the present invention transmits the first one of the interrupt request signals to the ISA bus and other interrupt requests queue at the logic gateway circuits. When the interrupt service routine associated with the first interrupt request signal is completed, the logic gateway circuit transmits the next interrupt request signal to the ISA bus so that the interrupt service routines associated with the interrupt request signal generated from the device ends can be executed in sequence.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENTS

Figure 1:
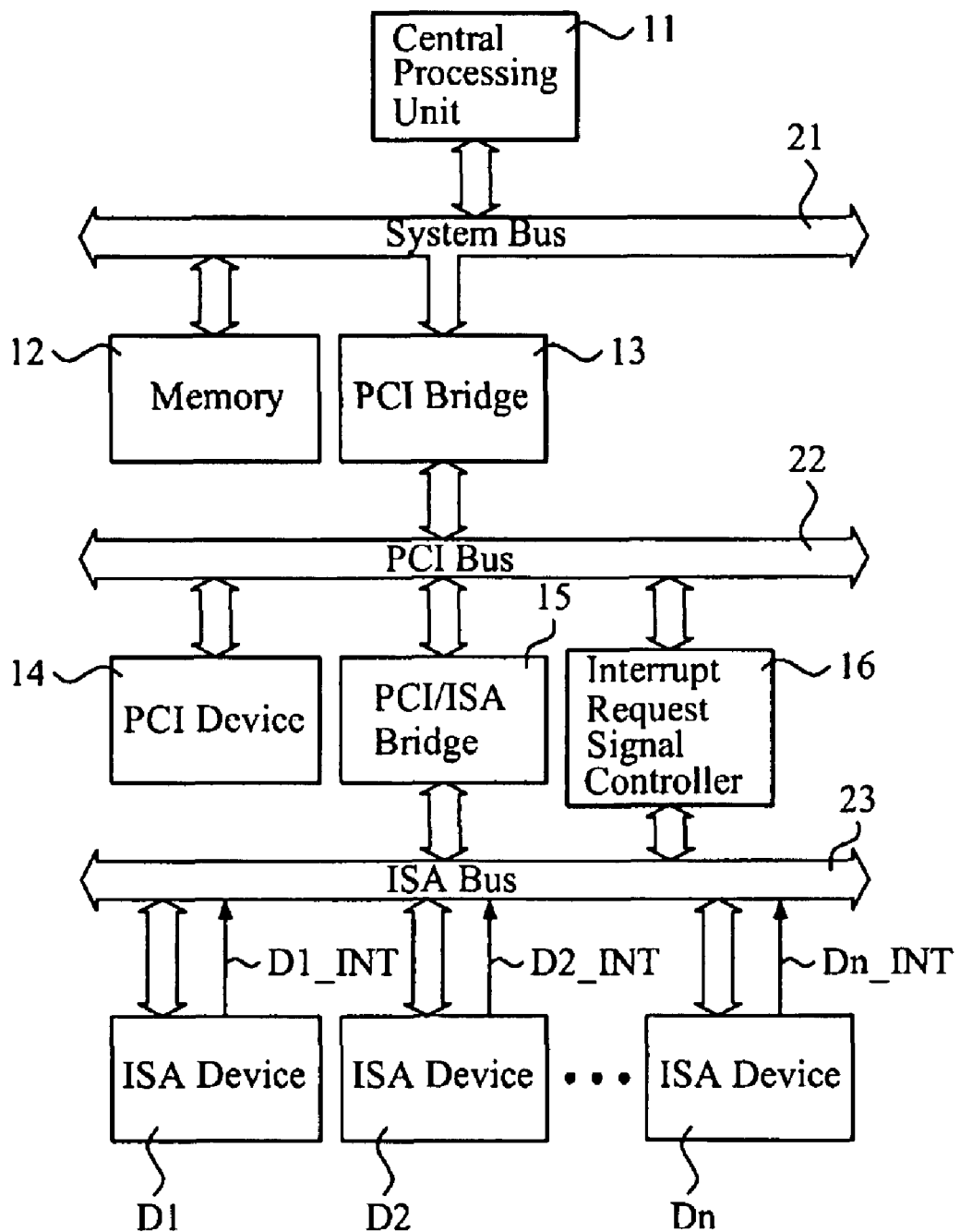
FIG. 1 shows a block diagram of a computer system or a digital system that comprises an ISA bus.
Figure 2:
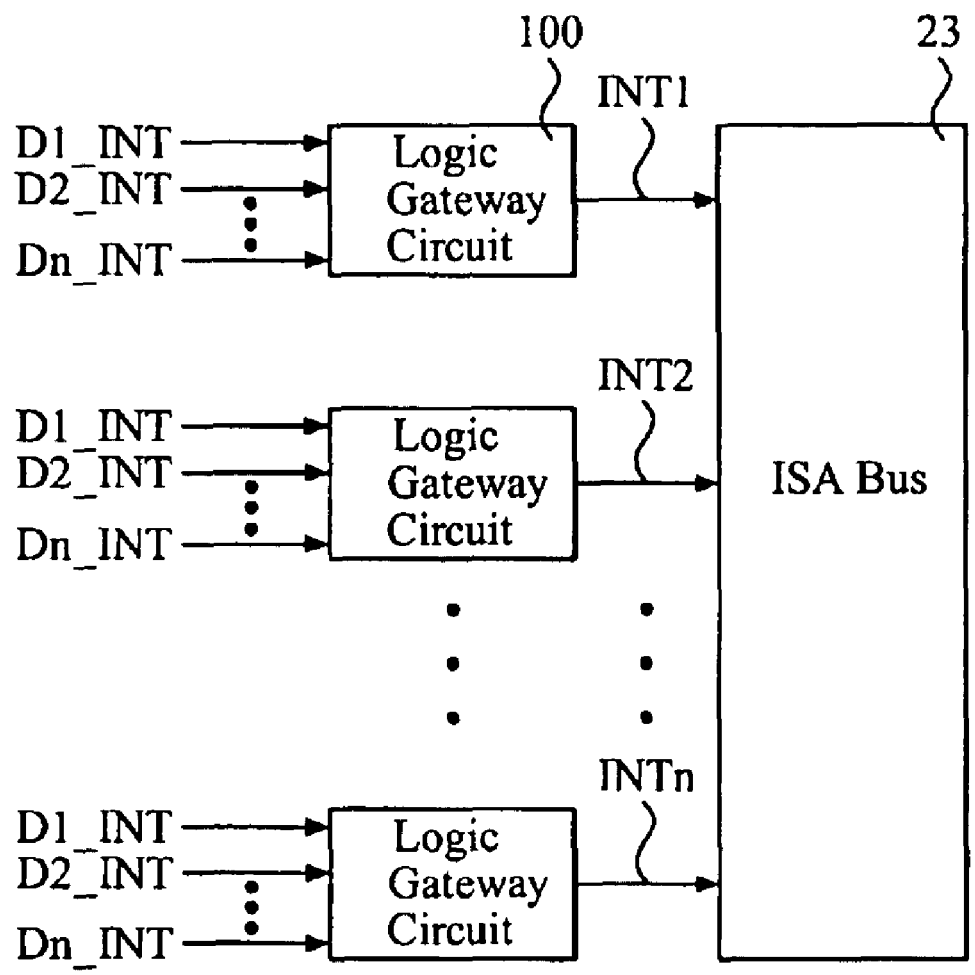
FIG. 2 shows a connection among logic gateway circuits in accordance with the present invention and the device-end interrupt request signals generated from a plurality of ISA devices and an ISA bus.

With reference to the drawings and in particular to FIG. 2, which shows a circuit connection among a plurality of logic gateway circuits constructed in accordance with the present invention, generally designated with reference numeral 100, and the device-end interrupt request signals D1_INT, D2_INT, D3_INT, . . . , Dn_INT generated by a plurality of ISA devices and an ISA bus 23, each device-end interrupt request signal D1_INT, D2_INT, D3_INT, . . . , Dn_INT is processed by an associated one of the logic gateway circuits 100 in accordance with the present invention and then applied to the ISA bus 23.

Figure 3:
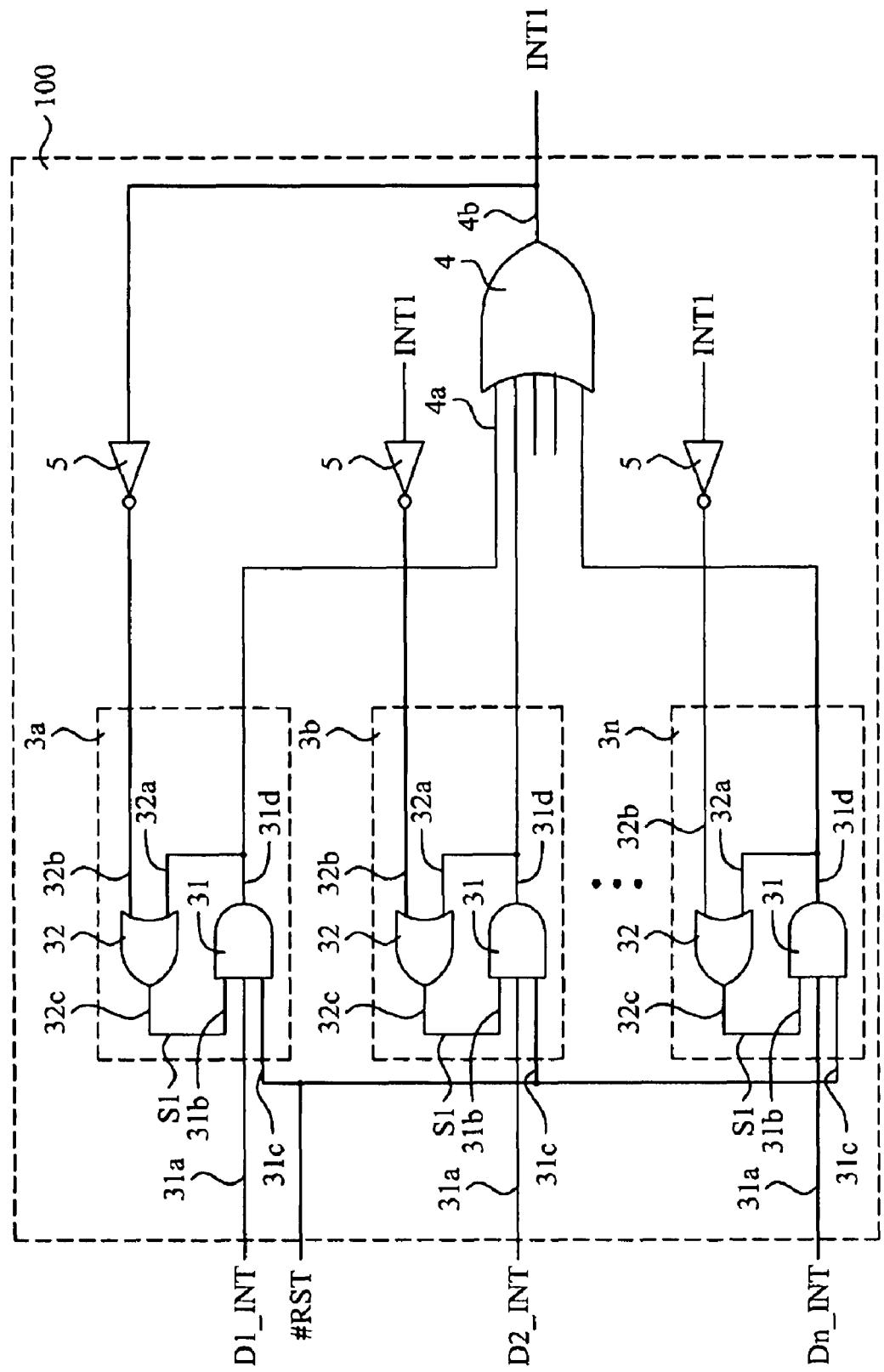
FIG. 3 shows a detailed circuit diagram of the logic gateway circuit in accordance with the present invention.
Figure 4:
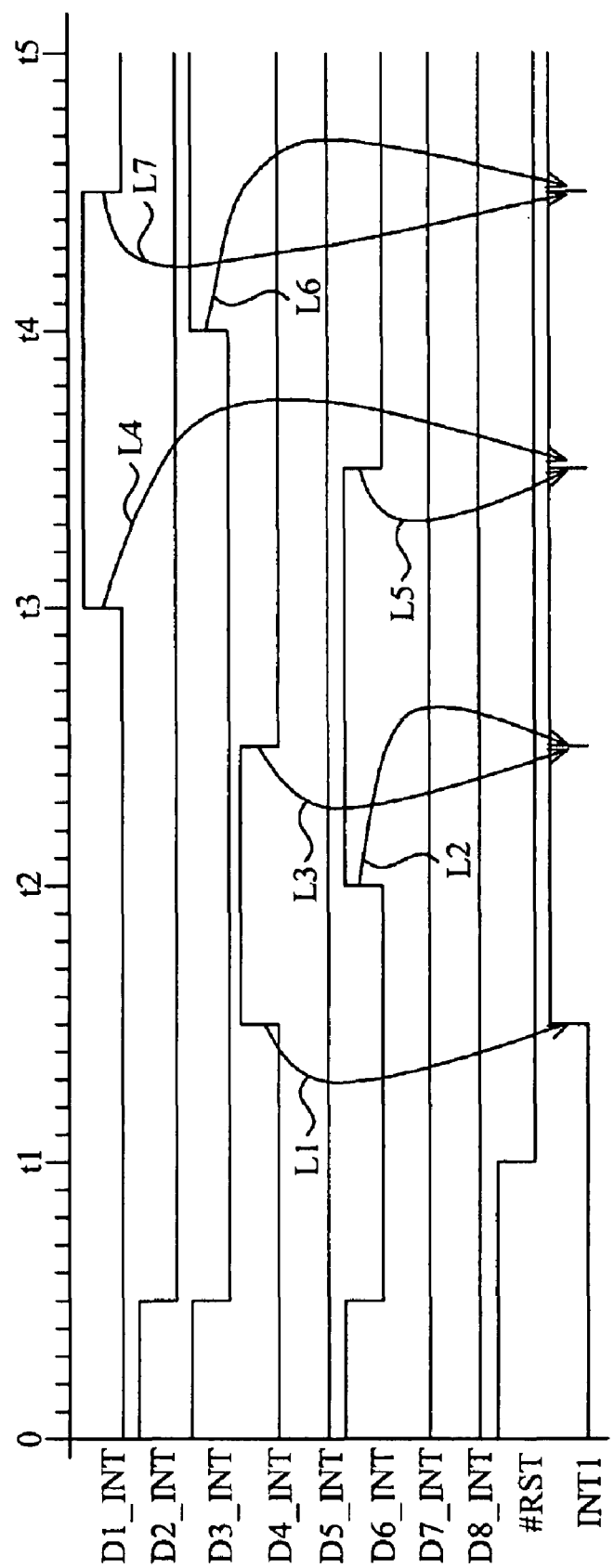
FIG. 4 shows the waveforms of the device-end interrupt request signals of FIG. 3 and sequentially executing interrupt request signals.

Also referring to FIGS. 3 and 4, FIG. 3 shows a detailed circuit diagram of the logic gateway circuit 100 in accordance with the present invention, and FIG. 4 shows the waveforms of the device-end interrupt request signals D1_INT, D2_INT, D3_INT, . . . , Dn_INT and sequentially executing the interrupt request signals.

As shown in FIGS. 2 to 4, the logic gateway circuit 100 of the present invention comprises a plurality of gateway circuits 3a-3n. The device-end interrupt request signal D1_INT, D2_INT, D3_INT, . . . , Dn_INT generated by each target device is applied, respectively to the gateway circuit 3a-3n of the logic gateway circuit 100 whereby each gateway circuit 3a-3n generates a logic signal to a corresponding logic signal input terminal 4a of an output OR gate 4 and an interrupt request signal INT1 is generated at an interrupt request signal output terminal 4b of the output OR gate 4 and applied to the ISA bus 23.

Taking the first gateway circuit 3a as an example for explanation (other gateway circuits being of the same structure), the gateway circuit 3a comprises an AND gate 31 and an OR gate 32. The AND gate 31 has an input terminal served as a device-end interrupt request signal input terminal 31a coupled to the device-end interrupt request signal D1_INT generated by the associated target device. The AND gate 31 also has a gateway signal input terminal 31b coupled to an output terminal 32c of the OR gate 32.

The OR gate 32 has a first input terminal 32a coupled to an output terminal 31d of the AND gate 31. The OR gate 32 also has a second input terminal 32b coupled via an inverter 5 to the interrupt request signal output terminal 4b of the output OR gate 4 to communicate the status of the interrupt request signal INT1 generated at the interrupt request signal output terminal 4b of the output OR gate 4. With such an architecture, the OR gate 32 bases on the statuses of the output terminal 31d of the AND gate 31 and the interrupt request signal output terminal 4b of the output OR gate 4 to generate a gateway signal S1 to the gateway signal input terminal 31b of the AND gate 31.

The AND gate 31 of each gateway circuit 3a-3n of the logic gateway circuit 100 is selectively provided with a reset input terminal 31c, and all the reset input terminal 31c are coupled in common to a reset signal #RST so that during initialization, all the AND gates 31 are reset by the reset signal #RST.

When none of the target devices generates a device-end interrupt request signal, the output terminal 31d of the AND gate 31 of each gateway circuit 3a-3n of the logic gateway circuit 100 is set in a low level. Thus, the logic gateway circuit 100 issues no interrupt request signal.

In case one of the target devices issues a device-end interrupt request signal, for example the first target device D1 generating a device-end interrupt request signal D1_INT, the output terminal 31d of the AND gate 31 of the gateway circuit 3a generates a high state logic signal to the logic signal input terminal 4a of the output OR gate, whereby the interrupt request signal output terminal 4b of the output OR gate 4 applies an interrupt request signal INT1 associated with said target device to the ISA bus 23.

At this point, since the first input terminal 32a of the OR gate 32 is of high state, although the second input terminal 32a of the AND gate 31 is allowed to change status in accordance with the signal level of the device-end interrupt request signal D1_INT generated by the ISA device, yet the output terminal 32c of the OR gate 32 is in a high state so that except the first gateway circuit 3a, the AND gates of all other gateway circuits 3b-3n are all disabled. Thus, at this time, even another ISA device generates its own device-end interrupt request signal to the AND gate of the corresponding gateway circuit 3b-3n, the AND gate of said corresponding gateway circuit 3b-3n cannot set the output terminal thereof to a high state logic signal to be applied to the output OR gate 4.

It is only until the interrupt service routine associated with the device-end interrupt request signal (for example D1_INT) of the first ISA device has been completely processed that the device-end interrupt request signal (for example D2_INT) of the second ISA device is allowed to pass through the AND gate of the gateway circuit 3b and the output OR gate to the ISA bus 23. In other words, the device-end interrupt request signal D2_INT of the second ISA device "queues" at the AND gate of the gateway circuit 3b until the device-end interrupt request signal D1_INT of the first ISA device has been completely processed and thereafter, the device-end interrupt request signal D2_INT of the second ISA device is forwarded through the output OR gate 4 to the ISA bus 23.

In accordance with the present invention, since the ISA bus 23 reading the interrupt request signal D1_INT, D2_INT, D3_INT, . . . , Dn_INT is done by detecting a signal rising edge of the interrupt request signal D1_INT, D2_INT, D3_INT, . . . , Dn_INT, no miss of picking up the device-end interrupt request signal of the second ISA device will occur.

As shown in the waveforms of the device-end interrupt request signals illustrated in FIG. 4, for example when the interrupt request signal D4_INT among D1_INT, D2_INT, D3_INT, . . . , D8_INT shows a rising edge for a high state in the time period between time points t1-t2, the logic gateway circuit 100 responds to the rising edge L1 and generates, at the interrupt request signal output terminal 4b of the output OR gate 4, a high state interrupt request signal INT1 to the ISA bus. Thereafter, the system executes the interrupt service routine corresponding to the interrupt request signal D4_INT.

In case that for example an interrupt request signal D6_INT shows a rising edge L2 for a high state at the time point t2, the logic gateway circuit 100 temporarily holds the interrupt request signal D6_INT in the logic gateway circuit 100 until the interrupt service routine associated with the interrupt request signal D4_INT is done (namely descending edge L3). Then the interrupt request signal D6_INT is carried out. With such a sequentially extending manner, all the interrupt request signal showing rising edges L4, L6 and descending edges L5, L7 in different time periods t3-t5 are handled sequentially and also sequentially handle the corresponding interrupt service routines.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A logic gateway circuit for a bus of a computer system, the bus supporting a plurality of interrupt request signals generated from a plurality of target devices connected to the bus, the logic gateway circuit comprising:

an output OR gate having a plurality of input terminals and an interrupt request signal output terminal; and a plurality of gateway circuits respectively connected between the interrupt request signal output terminal of the output OR gate and the target devices, each gateway circuit having an interrupt request signal input terminal electrically connected to one of the target devices for receiving the interrupt request signal generated by the target device and generating a gateway signal according to a signal state of the interrupt request signal output terminal of the output OR gate and a signal state of the interrupt request signal of the target device so as to allow the interrupt request signal of the target device to transmit through the gateway circuit to the output OR gate or to selectively queue the interrupt request signal in the gateway circuit;

wherein said logic gateway circuit being devoid of any processing software.

2. The logic gateway circuit as claimed in claim 1, wherein the gateway circuit comprises an inverter having an input terminal and an output terminal and wherein the input terminal is connected to the interrupt request signal output terminal of the output OR gate and the output terminal is connected to the gateway circuit.

3. The logic gateway circuit as claimed in claim 2, wherein the gateway circuit further comprises:

an AND gate, which has an input terminal served as the interrupt request signal input terminal, a gateway signal input terminal, and an output terminal, and wherein the interrupt request signal input terminal is connected to an associated target device to receive the interrupt request signal from said target device, and the output terminal is connected to an input terminal of the output OR gate; and an OR gate, which has first and second input terminals and an output terminal, wherein the first input terminal is connected to the output terminal of the AND gate, the second input terminal is connected to the output terminal of the inverter, and the output terminal is connected to the gateway signal input terminal of the AND gate, the OR gate basing on states of the output terminal of the AND gate and the interrupt request signal output terminal of the output OR gate to generate a gateway signal to the gateway signal input terminal of the AND gate.

4. The logic gateway circuit as claimed in claim 3, wherein the AND gate of the gateway circuit comprises a reset input terminal adapted to connect to a reset signal.

5. The logic gateway circuit as claimed in claim 1, wherein the bus comprises an Industry Standard Architecture (ISA) bus.

* * * * *